United States Patent [19]

Doble

[11] Patent Number: 4,934,579

[45] Date of Patent: Jun. 19, 1990

[54] ATTACHMENT OF DISSIMILAR METALS

[75] Inventor: Gordon S. Doble, Shaker Heights, Ohio

[73] Assignee: Compressor Components Textron Inc., Cleveland, Ohio

[21] Appl. No.: 259,444

[22] Filed: Oct. 14, 1988

Related U.S. Application Data

[63] Continuation of Ser. No. 129,870, Dec. 4, 1987, abandoned, which is a continuation of Ser. No. 844,060, Mar. 26, 1986, abandoned.

[51] Int. Cl.⁵ ............................................. B23K 31/02
[52] U.S. Cl. ................................. 228/135; 228/127; 228/131; 228/136
[58] Field of Search ............... 228/131, 135, 136, 137, 228/234, 243, 263.21, 265, 127

[56] References Cited

U.S. PATENT DOCUMENTS

| | | | |
|---|---|---|---|
| 2,998,646 | 9/1961 | Hitz | 228/127 |
| 3,530,568 | 9/1970 | Owczarski | 29/498 |
| 3,766,633 | 10/1973 | Lehrheuer | 228/135 |
| 3,950,841 | 4/1976 | Conn | 228/136 |
| 4,605,156 | 8/1986 | Stenger et al. | 228/127 |

FOREIGN PATENT DOCUMENTS

| | | | |
|---|---|---|---|
| 0195590 | 12/1982 | Japan | 228/131 |
| 0715258 | 2/1980 | U.S.S.R. | 228/127 |

*Primary Examiner*—Kurt Rowan
*Attorney, Agent, or Firm*—Edward J. Timmer

[57] ABSTRACT

A method of joining titanium to a dissimilar metal wherein a predetermined amount of heat and pressure is applied sufficient to plastically deform only one of the metals being joined. The heat and pressure combine to flow one metal into shaped surfaces existing in the second metal, maintain the joint in compression through differential thermal expansion and bonding the deformed metal to the other metal. The method uses a temperature sufficiently low to effect bonding without any chance for the formation of excessive brittle intermetallic phases.

9 Claims, 2 Drawing Sheets

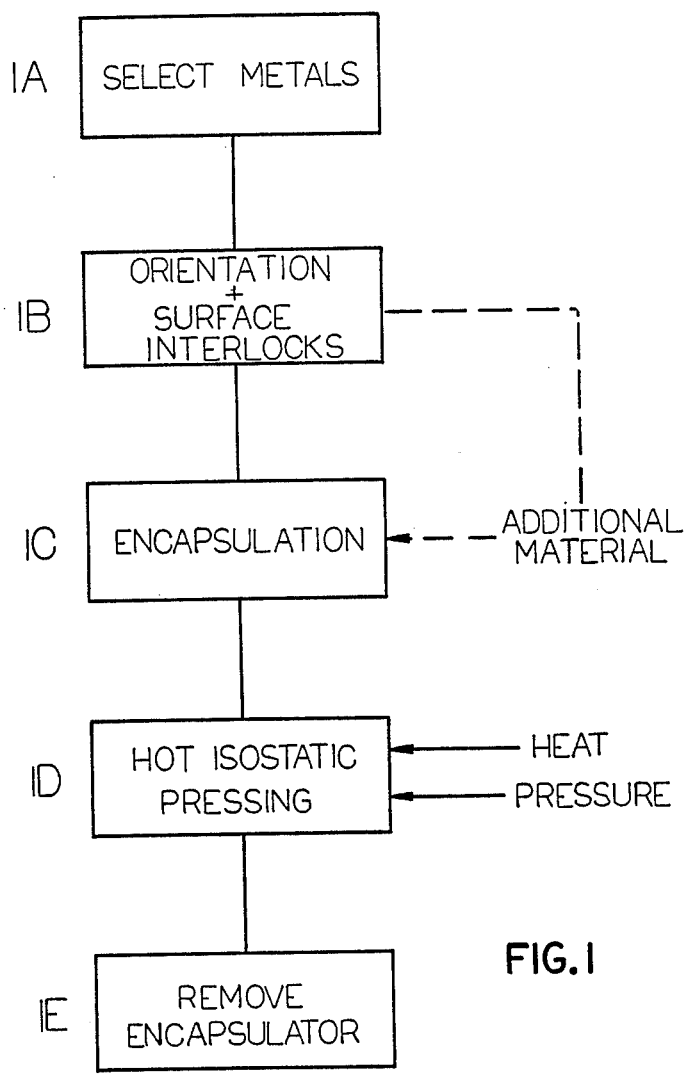
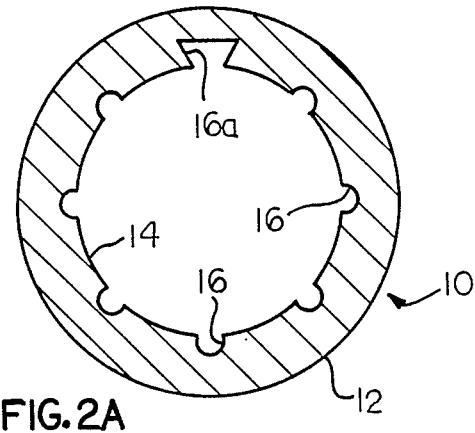
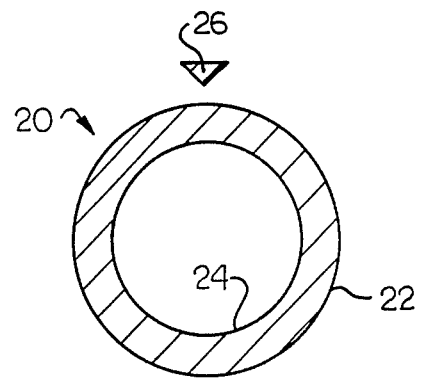

ATTACHMENT OF DISSIMILAR METALS

This is a continuation of co-pending application Ser. No. 129,870, filed on Dec. 4, 1987, now abandoned, which is a continuation of 844,060, now abandoned.

BACKGROUND OF THE INVENTION

This invention relates to a method of joining dissimilar metals through a combination of mechanical interlocking, diffusion bonding, and shrink fitting. The present invention is particularly suited for joining incompatible metals without the formation of excessive brittle intermetallic phases, and will be described with particular reference to the joining of a titanium matrix composite to a nickel-base super-alloy.

Many methods are known for joining dissimilar metals without the use of mechanical fasteners or conventional welding techniques. These methods include diffusion bonding, shrink fitting, and mechanical attachment among others. These processes used by themselves, are not completely satisfactory because they fail to produce a joint that can withstand rotational forces as well as tension and compression. Diffusion bonding utilizes the application of heat and pressure to physically merge the joining metals. In diffusion bonding, certain metals, such as, for example, nickel-based INCONEL 718 and titanium-based TI-6AL-4V, the technique, because of the high temperatures required creates certain undesirable intermetallic phases in the areas adjacent to the interface between the metals. Shrink fitting as a method of joining different metals utilizes the differential thermal expansion during cooling to produce a joint. The strength of the joint produced by each process is low and the use of the method is limited because it can be used only with certain geometries. Mechanical attachment is generally inefficient and does not provide a fully rigid joint.

There has been a need to provide an effective method for joining metals of the foregoing type while eliminating those problems typically associated with prior known joining methods and techniques. The subject invention is deemed to meet these needs, to overcome the above-expressed problems and others, and to provide a process for joining dissimilar metals which are normally incompatible for direct metallurgical union.

BRIEF SUMMARY OF THE INVENTION

In accordance with the preferred embodiment of the invention, physical joining is effected by utilizing the differential flow stress which exist between the metals at predetermined temperatures and pressures. The term flow stress as it is used herein means, in practicing the preferred method, the metal parts which are to be joined are first positioned with portions of their surfaces in contact with each other at an interface zone, and then heated to a predetermined temperature and subjected to a predetermined joining pressure wherein only one of the metals undergoes plastic deformation. The predetermined temperature and controlled direction of the pressure combine to cause the plastic metal to flow toward the non-plastic metal for physically bonding thereto. Following removal of the heat and pressure, the metals remain bonded upon cooling.

According to a further aspect of the invention, the method may include the use of a treatment or pretreatment for intentionally decreasing the flow stress of one metal with respect to the other.

According to another aspect of the invention, a workpiece is defined by the two metals, one being a donor and the other the receptor. The workpiece is generally tubular and the two metals coaxially oriented relative to one another.

Another aspect of the invention utilizes the coefficient of thermal expansion of the metals used in the workpiece. The metal having the higher coefficient of thermal expansion is positioned so it is in surrounding relation to the other workpiece so as to avoid separation of the metals during the cool-down portion of the process.

In accordance with a further aspect of the subject invention, interlocks in the form of shaping the surfaces are advantageously incorporated into the interface surfaces of the workpiece which is constructed from the non-plastic metal. These interlocks advantageously increase the mechanical strength of the interconnection between the metals which is greater than the individual strengths of the metals.

One advantage of the present invention is the capability of reliably predicting the strength of a bond formed between normally incompatible metals.

Another advantage resides in the noncritical self-limiting operating parameters of the bonding process to join the two workpieces together.

Still another advantage is found in the capability of physically joining incompatible metals without creating excessive brittle intermetallic compounds.

A further advantage of the present invention is the permanence of a joint formed between two incompatible metals.

Still other advantages and benefits of the invention will become apparent to those skilled in the art upon a reading and understanding of the following detailed specification.

BRIEF DESCRIPTION OF THE DRAWINGS

The invention may take form in certain parts and arrangements of parts, preferred and alternative embodiments of which will be described in detail in this specification and illustrated in the accompanying drawings which form a part hereof and wherein:

FIG. 1 is a flow chart showing the steps of manufacturing a joint between two incompatible metals in accordance with the present invention;

FIGS. 2A-2B comprise schematic cross-sectional views of two separate metallic workpieces to be joined together in accordance with the method steps of FIG. 1;

DETAILED DESCRIPTION OF THE PREFERRED EMBODIMENT

Figure 3:
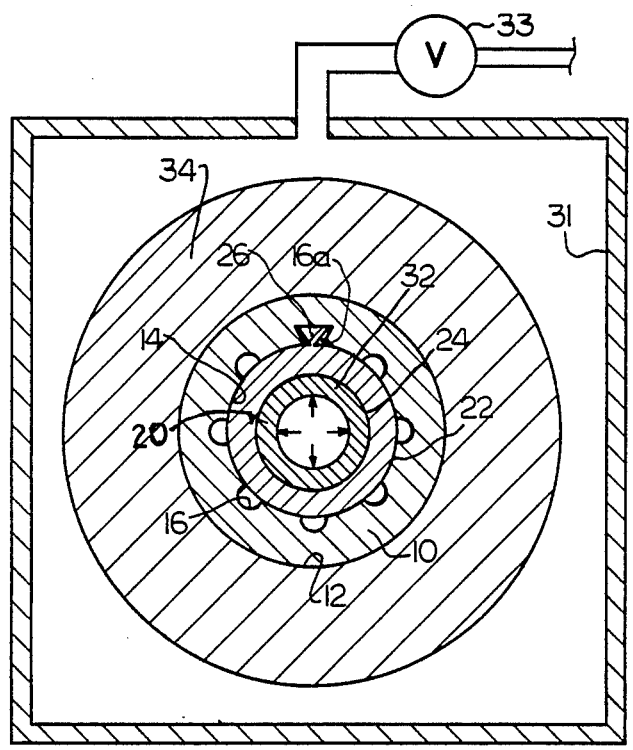
FIG. 3 is a schematic of the workpieces to be joined assembled with the encapsulator and located in the Hot isostatic pressure unit.

Referring now to the drawings wherein the showings are for purposes of illustrating the preferred and alternative embodiments of the invention only and not for limiting same, FIG. 1 comprises a flow chart showing the method of manufacturing a joint between two dissimilar metals in accordance with the present invention.

In FIG. 1, the first step of the method is designated 1A and comprises selecting the metals to be joined.

Since the new method minimizes any stage wherein brittle intermetallic substances could be formed, the selection of the metals depends primarily upon the differential in flow stress properties of the metals at the temperature one of the metals exhibits plastic flow. To that end, there must be a sufficient difference between the deformability (plastic deformation) of the metals at the temperature-pressure conditions of the fabrication process to be utilized in order that only one of the two metals will undergo plastic deformation. The minimum temperature at which this occurs will provide minimum intermetallic compound formation. There are generally no requirements in the selection of the two metals other than differential flow stress at the working temperature and the use of the lowest practical temperature. The metals normally are or have been chemically cleaned to facilitate better bonding.

The concept of the subject invention will be described herein with specific reference to a joint formed between INCONEL 718, a nickel-base alloy and titanium-6 aluminum-4 vanadium (TI-6AL-4V), a titanium-based alloy. The subject method is particularly suitable for joining these two metals as they are otherwise incompatible for joining due to the creation of brittle intermetallics if both metals are melted together, or if either metal is melted with a single common intermediate metal.

The second step of the method comprises orientation of the metals to be joined as designated by step 1B in FIGURE 1. The metals must be oriented relative to each other with some provision for creating a solid joint therebetween.

For purposes of describing the invention, reference will be made to a joint between two coaxially disposed tubular workpieces constructed of the INCONEL 718 and the TI-6AL-4V metals previously noted. It is desired to obtain a strong joint between these workpieces that is capable of transmitting torque and/or thrust without separating. It is also to be appreciated that the invention is suitable for use with any number of different metals, or any workpiece orientation and configuration with the application of an appropriate deformation force. However, it is necessary for deformation to occur in a metal which is in its plastic stage, and not in the adjoining metal.

As shown in FIG. 2A, a first workpiece 10 formed of the INCONEL 718 metal has an annular cross-section including an outer wall 12 and an inner wall 14. Inner wall 14 is provided with a series of circumferentially spaced, axially extending grooves 16. As will become apparent, the grooves can be of various cross-sectional shapes but are shown as semi-circular. The axial orientation of the grooves has been selected to match the torque or rotational forces to which the INCONEL 718 - TI-6AL-4V joint will ultimately be subjected. In the specific example described herein, outer wall 12 defines a workpiece outer diameter of about 1.25", and inner wall 14 defines a workpiece inner diameter of about 1.00". In the specific example described herein, grooves 16 are approximately 0.062" deep. Since the INCONEL 718 has a coefficient of thermal expansion greater than the TI-6AL-4V, the INCONEL 718 has been selected to be the outer, surrounding metal for reasons which will become apparent hereinafter.

Depending upon the forces which the final joint is expected to experience, other conformations and orientations for interlocks 16 may be appropriate. For example, if the forces applied to the completed joint are to be axial in nature, a circumferential orientation of the interlocks would be preferred. In all instances, the interlocks can be designed to provide the required strength and reliability of the joint with accurate prediction of the direction.

Of the two metals, the INCONEL 718 of first workpiece 10 has the higher tensile strength at the bonding temperature. It has, therefore, been machined into approximately its final form. Because of the temperature and pressure conditions to be used in the well known hot isostatic pressing (HIP) process, the INCONEL 718 will not flow or otherwise be deformed during the actual bonding process, i.e., it will not be substantially altered in shape or size by the subsequent manufacturing steps.

FIG. 2B shows a second workpiece 20 formed of the TI-6AL-4V to have an annular cross-section with an outer wall 22 and an inner wall 24. In the particular example being described, outer wall 22 defines a workpiece outer diameter slightly less than the 1.00" inner diameter of first workpiece 10. Inner wall 24 defines a workpiece inner diameter which, in the case of the specific workpiece conformation being described, is sufficiently large, approximately 0.625", to receive the inner HIP pressure member in a manner described. The total volume of second workpiece 20 is substantially equal to the calculated total volume of the TI-6AL-4V metal when it is formed to its ultimate joined shape.

In that second workpiece 20 will be altered in shape and size by the subsequent steps of manufacture, it is not initially machined into its final form. It should be noted that if the circumferentially spaced, axially extending grooves 16 in first workpiece 10 had been of such conformation that the entrance area to each groove at inner wall 12 is smaller than any other groove dimension, e.g., triangular grooves with a small apex opening inwardly as shown by groove 16a in FIG. 2A, or if the volume of the grooves is such that it would otherwise take an extensive material flow, e.g., very deep, very long and/or wide grooves, it would be advantageous to provide an additional supply or reservoir of the TI-6AL-4V material from which second workpiece 20 is constructed. This additional material could be provided in the form of a thicker wall of the workpiece 20, as separate pieces 26, or by other convenient means so as to partially fill the grooves 16a and reduce the extend of the TI-6AL-4V metal flow that otherwise would be required. Any additional metal thus provided would be included in the calculations for the total volume of TI-6AL-4V.

The third step of the method of manufacture comprises locating the metals to be joined in a hot isostatic pressure unit for application of the appropriate amount of heat and pressure. This step is identified by 1C in FIG. 1. The type of heat and pressure used in this step depends upon the choice of metals and the particular type of joint to be formed therebetween. It will be appreciated that only one of the metals to be joined be deformable or plastic at the particular conditions of heat and pressure employed in this step.

In the specific joint arrangement shown and described, the first or outer tubular shaped workpiece 10 of INCONEL 718 is coaxially oriented relative to the second or inner tubular workpiece 20 of TI-6AL-4V, that is, they are in an interfitting relationship one inside the other. The predetermined heat and pressure conditions are applied to the interfitted workpieces by a hot isostatic pressing (HIPing) furnace. The construction and use of HIP furnaces are known in the art and do not themselves form a part of the present invention. Therefore, the furnace is only schematically shown in FIG. 3 and generally designated by numeral 30.

In the typical construction of a HIPing furnace there is provided an enclosure 31 adapted to withstand pressure created inside the enclosure in the range of 15,000 to 45,000 psi. The workpieces 10 and 20 are encapsulated between an inner heavy wall 32 and an outer heavy wall 34. The inner wall 32 is designed to flow at high pressure and in the arrangement shown in FIG. 3 upon the application of high pressure expands radially outward forcing the workpiece 20 against the interface zone 14. The outer heavy wall of the encapsulator 34 does not flow at the high pressure but transmits the pressure radially against the inner wall on the workpieces interposed between walls 32, 34. A hot isostatic pressure furnace utilizes a gas as the pressure medium. The gas commonly used comprises a noble gas such as argon. The use of a gas as the pressure medium ensures the even application of a well-controlled force.

The concept may also employ equivalent wall thicknesses 32 and 34 where the strength of workpiece 10 is sufficiently high to prevent strain radially outward.

Inner wall 32 of the encapsulator is of a size such that it is adapted to fit within the interior of the TI-6AL-4V second workpiece 20. Outer wall 34 is essentially a hollow cylinder of a size that it is adapted to closely surround outer wall 12 of the INCONEL 718 first workpiece 10. The first workpiece 10 is placed in generally coaxial surrounding relation to second workpiece 20, and these still unbonded workpieces are placed into HIP furnace 30 (FIG. 3). The coextensive areas of first workpiece inner surface 14 and second workpiece outer surface 22 define an interface area or zone 40. If any additional amount of the TI-6AL-4V metal is deemed necessary and appropriate for reasons described above, it is placed in position at this same time, e.g., strips 26.

The next step of the method is schematically shown in step 1D of FIG. 1 and comprises the application of heat and pressure to the HIP furnace. The furnace 30 is equipped with valve 33 which is opened to admit to the furnace an inert gas, such as argon, under high pressure. The furnace is heated to a temperature that causes only one of the two metals being joined to enter a state of plastic deformability at the pressure being utilized. The heat and pressure are selected at the appropriate level sufficient to press the plasticized metal into the surface of the other metal. Since movement of the plastic metal is physically controlled by the positioning of the non-plastic metal, the actual amount and time of heat and pressure application is not critical. It is preferred, however, that the amount and time of heat and pressure be chosen so that the plastic metal flows smoothly to the non-plastic metal. If movement of the plastic metal occurs at too rapid a rate, it may cause rupture of the encapsulator or the plastic metal. If movement is too slow, time is wasted and, in addition, the overlong exposure to heat can have a deleterious effect on certain metal combinations by the formation of intermetallic compounds.

Figure 4:
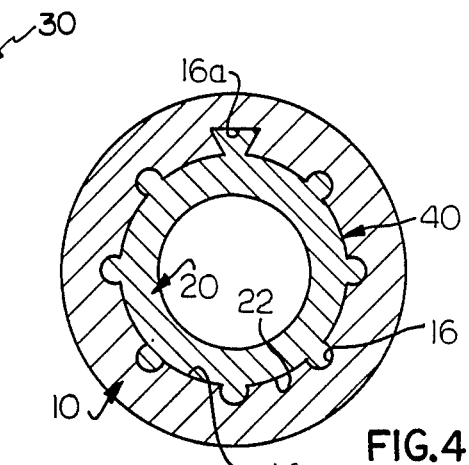
FIG. 4 is a schematic of an actual joint formed between two metals using the techniques of the subject invention.

In the specific INCONEL 718 - TI-6AL-4V example, a HIP-ing temperature of about 1525° F. and a pressure of about 30 ksi were maintained for 2 hours to effect bonding of the two metals. The 1525° F. temperature allows deformation of the TI-6AL-4V of second workpiece 20 at the 30 ksi pressure but is insufficient to permit deformation of the INCONEL 718 first workpiece 10. The combination of pressure and heat causes the plastic TI-6AL-4V to flow gradually outward to physically mold itself to the surrounding INCONEL 718 at interface zone 40. Such result is shown in FIG. 4. The metal of second workpiece 20 is physically locked to the metal of first workpiece 10 by the interlocks 16 and any tiny imperfections in the inner wall 14 of the first workpiece. As soon as the plastic TI-6AL-4V metal fills the grooves and any imperfections in the inner wall of workpiece 10, all motion and movement of the TI-6AL-4V stops no matter how much longer heat and pressure are applied. Such result is in accord with the self-limiting movement of the plastic metal in practicing this invention.

The time of 2 hours was determined to be sufficient to permit the self-limiting movement to fully take place and thereby ensure that the bonding was fully completed before removal of the heat and pressure. The conditions of heat and pressure could be varied within certain limits to yield the same result of complete bonding, and there is a range of operability of heat and pressure combinations that would occasion plastic deformation of only one of the two metals in the specific example described herein.

Figure 5:
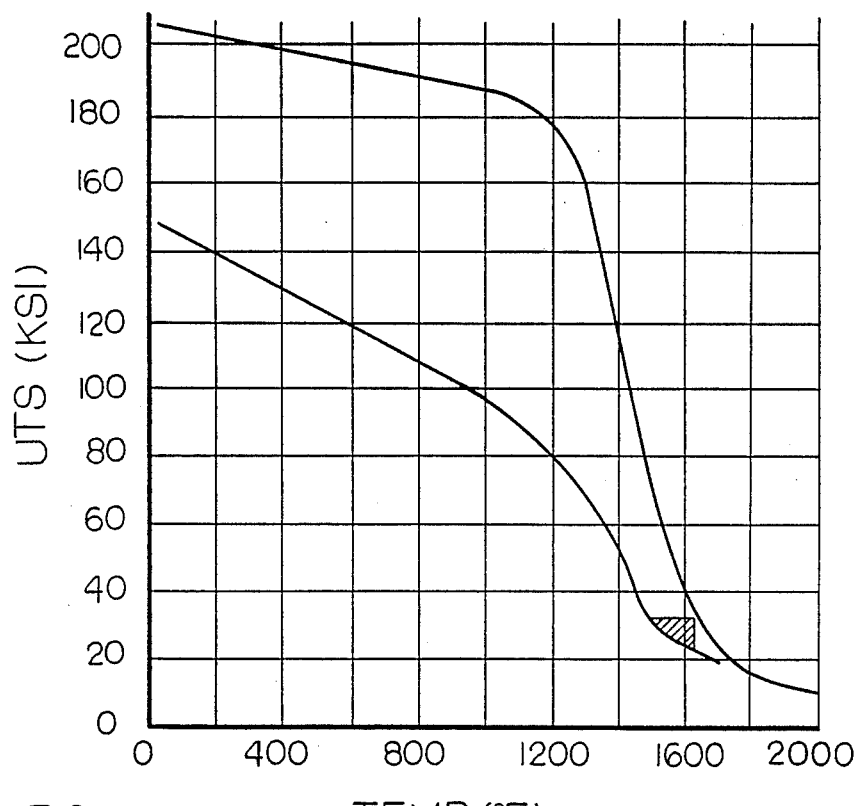
FIG. 5 is a graph showing the differential in tensile strength between two specific metals at varying temperatures and pressures.

FIG. 5 plots the tensile strengths of the INCONEL 718 and the TI-6AL-4V alloys versus temperatures. The shaded area of the plot includes the combinations of temperatures and corresponding pressures which represent the operable ranges. The operable range of temperatures and pressures at which the TI-6AL-4V metal will flow while the INCONEL 718 10 remains stable includes pressures of from 20–30 ksi at a constant temperature of 1650° F. and the temperature range of from 1500°–1650° F. using a HIP vessel rated at 30 ksi. Since metals deform at elevated temperatures by creep as well as by flow stress, the exact temperature and pressure parameters utilized might vary from these values. It is preferred that the temperature be maintained at a low value for sake of economy, safety, and accuracy. Maximum pressure is dictated by the capacity of the HIPing equipment. It will be appreciated that the operable range includes any pressure-temperature combination within the two graphs could be used with some compromise in the benefits of economy, safety and accuracy. However, any increase in time and/or temperature from those absolutely necessary will increase the possibility that undesirable brittle intermetallics will be formed at the interface between the two incompatible or dissimilar metals.

The invention has been described in terms of a method of applying heat and pressure to plastically deform one metal workpiece which is interfittingly disposed with another workpiece to interlock and the metals diffuse into another at the interface. In fact, any bonding technique may be utilized in carrying out the invention wherein the strength of one material is selected or intentionally reduced for providing a condition where such material can be reduced to a plastic condition while another material remains relatively undeformed. The reduction of strength could be caused by any means. For example, one skilled in the art will appreciate that since the INCONEL 718 first workpiece 10 is not undergoing deformation, it technically is not necessary to apply heat thereto. The TI-6AL-4V second workpiece 20 could be heated by itself to a temperature at which it would become plastic and flow prior to the time that it is placed in the pressure apparatus in properly spaced relation to the first workpiece.

The foregoing pretreatment of the second workpiece would produce the required condition of reducing its strength to facilitate practicing the subject invention. Alternate treatments could also be advantageously employed such as, for example, other thermomechanical processing steps, grain size control, and the like. In addition, two compatible metals, both of which are in a plastic state, could be located in series with each other to be deformed together for mating with a single non-plastic metal, or they could be located on either side of a non-plastic metal for individual deformation from opposite directions into the non-plastic metal.

Once two metals have been bonded together in accordance with the subject invention, they are removed from the furnace and the accompanying pressure device as is schematically shown by step 1E of FIG. 1. Care must be exercised to avoid adversely affecting the strength of the joint due to the different thermal contraction of the differing metals. It is, therefore, important that the bond between the differing metals be designed to inherently accommodate different contraction rates. This may be achieved by placing the metal with the higher thermal coefficient surrounding the metal with the lower coefficient such that the bonding is maintained in compression caused by shrinking the outer metal onto the inner metallic surface. Other methods of compensation could also be used.

In the INCONEL 718 - TI-6AL-4V example disclosed herein, the method of compensation employed comprises placing the metal with the higher thermal coefficient, i.e., the INCONEL 718, in surrounding relation to the metal with the lower thermal coefficients, i.e., the TI-6AL-4V. Due to this orientation, the joint between these two metals will not be unduly compromised by the difference in thermal expansion-contraction of the two joined metals, and the joint will not be separated by the inner metal shrinking faster than the outer or surrounding metal.

In the specific INCONEL 718 - TI-6AL-4V example, inner and outer walls 32, 34 may be removed from the joined first and second workpieces 10, 20 through the use of acid dissolution or machining (not shown). After the walls 32 and 34 are removed, all that remains is the bonded combination of the INCONEL 718 first workpiece and the TI-6AL-4V second workpiece. This actual bonded combination is shown in FIG. 4. As will be seen, the TI-6AL-4V has been molded and bonded into the inner wall 12 and interlocks 16 of the INCONEL 718. The two metals are thus physically joined without the creation of excessive brittle intermetallics. In that the joint was created with one of the two metals in a plastic stage, the joint is permanent and is irreversible.

Once the two metals are joined as shown in FIG. 4, they can be machined as a unitary piece into their combined final dimensions if necessary and/or appropriate. In that the INCONEL 718 first workpiece 10 never entered into the plastic stage, only a minimum amount of machining will be necessary since the dimensions of the INCONEL 718 will not have been significantly altered during the bonding process. The amount of machining necessary on the second workpiece 20 will depend upon the choice of initial volume for the TI-6AL-4V metal and on the precision of the molding process. The amount of machining required may be controlled as a function of the degree to which these parameters are tightly observed. In any event, since the TI-6AL-4V metal was reduced to a plastic state during the joining process, it will require more machining than the INCONEL 718 first workpiece.

The strength of the interlocked bond formed in accordance with the method of this invention is considerable. The physical bond formed during the HIPing, the shrink fit occasioned during cooling after HIPing, and the mechanical interlocking of the shaped surfaces all add to the strength. The joint transmits forces and vibrations in the same manner as a solid homogeneous unit and not in the manner of a splined interconnection. The joint of the specific example described herein has a shear strength of from 18 to 30 ksi as measured in a punch out test. The specific grooved mechanical interconnection described above for providing added torsional strength also provides axial strength for the joint.

The invention has been described with reference to preferred and alternative embodiments. Obviously, modifications and alternations will occur to those skilled in the art. It is intended to include all such modifications and alternations insofar as they come within the scope of the following claims or the equivalents thereof.

What is claimed is:

1. A method of physically joining two dissimilar metals at an interface zone, comprising the steps of:
    providing preformed first and second hollow, elongate metal parts to be joined, each part possessing differential flow stress under conditions of high temperature and pressure, said second part having a greater solid state plastic deformation when heated to a predetermined temperature than said first part, said first part having a greater coefficient of thermal expansion than said second part;
    forming interlocks on the surfaces of said first and second parts by shaping the surface of one of said parts at which bonding is to occur;
    interfitting the second part inside the first part with the exterior of the second part and the interior of the first part juxtaposed and their longitudinal axes extending in the same direction and in a manner that is directionally responsive to said heat and pressure with the second part movable toward the first part transverse to their longitudinal axes and the first part being substantially immovable so as to control extent of movement of the second part;
    placing the interfitted parts into a hot isostatic environment where gaseous pressure is transmitted to the exterior of the first part and the interior of the second part in a direction transverse to the longitudinal axes thereof and a temperature is maintained at which said second part undergoes solid state plastic deformation and a corresponding configurational change of its interior and exterior along its length relative to said first part and moves toward the first part as controlled thereby in a self-limiting manner as a result of said first part being substantially immovable during said plastic deformation of said second part for diffusion bonding said parts,
    whereby said second part interlocks and diffusion bonds along its length to said first part, forming a diffusion-mechanical joint.

2. The method of claim 1 wherein the method further includes the step of cooling the parts subsequent to plastic forming such that the joint is maintained in compression during said cooling.

3. A method of physically joining two different metals at an interface zone and wherein said metals have different flow stresses, said method comprising the steps of:

forming a plurality of circumferentially spaced apart, axially extending grooves in the one metal having the higher flow stress compared to the other metal, said grooves being formed in a first interior, tubular surface of the one metal which surface will comprise a part of said interface zone, said one metal having a greater coefficient of thermal expansion than said other metal;

placing said metals in a desired cooperative relationship with each other such that said first interior surface cooperates with a first exterior surface of the other metal to define said interface zone and such that upon heating said metals to a predetermined temperature and application of predetermined pressure said first exterior surface moves toward the first interior surface and the first interior surface is substantially immovable and thereby controls the extent of movement of the first exterior surface;

heating both metals to said predetermined temperature and applying said predetermined pressure on a second interior tubular surface of said other metal such that said other metal moves by solid state plastic deformation toward the first interior surface; and plastic forming said metals together at said interface zone with said other metal deforming plastically to substantially fill said grooves in said one metal and move said first exterior surface toward and against the substantially immovable first interior surface in a self-limiting manner as a result of said one metal being substantially immovable during said plastic deformation of said other metal for diffusion bonding to said first interior surface, said filling of the grooves and bonding of said one metal and said other metal providing a diffusion-mechanical joint therebetween resistant to torsional forces applied on the joint in service.

4. The method of claim 3 wherein said step of placing said metals in a desired cooperative relationship maintains said interface zone in compression during cooling.

5. The method of claim 3 further including the step of placing small pieces of a filler metal into said grooves prior to the step of plastic forming.

6. The method of claim 5 wherein said step of placing includes forming said piece of filler metal from said other metal.

7. A method of physically joining workpieces comprised of two different metals having differing flow stresses and thermal expansion coefficients, said method comprising the steps of:

forming the first of said two metals having the higher thermal coefficient into a first elongate, tubular workpiece having a cylindrical interior surface adapted to at least partially surround a second workpiece;

forming the second of said two metals having the lower thermal coefficient into a second, elongate tubular workpiece having a cylindrical exterior surface adapted to be at least partially surrounded by said first workpiece;

forming a plurality of circumferentially spaced, axially extending grooves in the interior surface of said first workpiece;

placing said workpieces in a desired orientation relative to each other with said first workpiece interior surface closely surrounding at least a portion of the exterior surface of said second workpiece at an interface so as to control and limit movement of the second workpiece toward the first workpiece;

heating both workpieces to a predetermined temperature wherein at a predetermined pressure only said second metal exhibits solid state plastic deformation and the first workpiece is substantially immovable;

exerting said predetermined pressure on an interior surface of said second workpiece in a radial direction toward the first workpiece to effect solid state plastic forming of said second metal and a corresponding configurational change of its interior surface and exterior surface along its length until the grooves in said first workpiece interior surface are substantially filled with said second metal as controlled by the first workpiece in a self-limiting manner as a result of said first metal being substantially immovable during said plastic deformation of said second metal;

diffusion bonding the workpieces at the interface;

cooling said workpieces with the relative orientation thereof causing said second workpiece to control contraction of said first workpiece, and said filling of the grooves and bonding of said metals providing a diffusion-mechanical joint therebetween resistant to torsional forces applied on the joint in service.

8. The method of claim 7 wherein said first workpiece is configured to completely surround said second workpiece at the area of interconnection therebetween.

9. The method of claim 7 further including the step of inserting a small filler piece of said second metal into the groove of the first workpiece at the interface area between said first and second workpieces.

* * * * *